United States Patent [19]

Shah

[11] Patent Number: 5,183,291
[45] Date of Patent: Feb. 2, 1993

[54] AUTOMATIC SEAT AND SHOULDER BELT APPARATUS

[76] Inventor: Mrugesh K. Shah, 3912 Brookhaven, Pasadena, Tex. 77504

[21] Appl. No.: 668,762

[22] Filed: Mar. 13, 1991

[51] Int. Cl.$^5$ .............................. B60R 22/06
[52] U.S. Cl. .............................................. 280/804
[58] Field of Search ............... 280/802, 804, 807, 808; 244/122 R, 122 B; 297/469, 473

[56] References Cited

U.S. PATENT DOCUMENTS

| | | | |
|---|---|---|---|
| 3,371,960 | 3/1968 | Bayer et al. | 244/122 |
| 3,554,577 | 1/1971 | Hane | 244/122 |
| 3,830,518 | 8/1974 | Silber | 280/804 |
| 3,833,239 | 9/1974 | Coenen | 280/804 |
| 3,887,212 | 6/1975 | Weman | 280/802 |
| 3,900,078 | 8/1975 | Otani | 280/804 |
| 3,926,455 | 12/1975 | Lindblad | 280/804 |
| 3,977,701 | 8/1976 | Weman | 280/802 |
| 4,027,900 | 6/1977 | Igeta | 280/804 |
| 4,059,287 | 11/1977 | Weman | 280/802 |
| 4,070,040 | 1/1978 | Igeta | 280/804 |
| 4,082,317 | 4/1978 | Weman | 280/802 |
| 4,247,064 | 1/1981 | Schulman et al. | 244/122 |
| 4,275,903 | 6/1981 | Matsuoka et al. | 280/803 |
| 4,286,804 | 9/1981 | Maekawa et al. | 280/803 |
| 4,751,555 | 5/1988 | Frantom et al. | 280/803 |

FOREIGN PATENT DOCUMENTS

| | | | |
|---|---|---|---|
| 0364131 | 4/1990 | European Pat. Off. | 280/804 |
| 0261559 | 11/1987 | Japan | 280/804 |

Primary Examiner—Charles A. Marmor
Assistant Examiner—Tamara L. Graysay
Attorney, Agent, or Firm—Pravel, Gambrell, Hewitt, Kimball & Krieger

[57] ABSTRACT

A steel track for the driver's seat belt and shoulder belt including a substantially horizontal floor portion adjacent the door of the vehicle connected to a substantially vertical side portion forward of the seat and an additional substantially vertical side portion secured along the door post of the vehicle. The seat belt and shoulder belt have a first end which slides along the track using a pulley in response to a predetermined condition, such as opening of the vehicle door.

16 Claims, 5 Drawing Sheets 5,183,291

AUTOMATIC SEAT AND SHOULDER BELT APPARATUS

BACKGROUND OF THE INVENTION

1. Field of the Invention

The present invention relates to automatically activated seat and shoulder belts.

2. General Background of the Invention

There are many passive restraint systems, in use and in theory, to help protect a person from harm when he is in an automobile involved in an accident. Such systems include air bags and automatically engaging safety belts. There are a number of safety belt systems for use in automobiles which, though they are automatic in the sense that the user of the auto need do nothing to become restrained, they are connected to the door of the automobile, and thus may not be effective if the door of the automobile were hit. The following U.S. Pat. Nos. disclose such systems: 3,411,602; 4,004,829; 4,084,841; 4,211,430; 4,275,903; 4,286,804; 4,372,580; 4,498,689; 4,580,812; 4,621,835; 4,655,312; 4,741,555; 4,787,651; 4,796,915; and 4,796,916. Other automatic safety belt systems are disadvantageous in that they include rigid moving parts which could possibly injure a user of the automobile. The following U.S. Pat. Nos. disclose such systems: 3,343,623; 3,613,819; 3,653,714; 3,717,216; 3,743,046; 3,781,061; 3,795,411; 3,854,749; 3,887,212; 3,897,082; 3,907,059; 3,977,701; 4,059,287; 4,082,317; 4,509,798; and 4,247,064.

SUMMARY OF THE INVENTION

The present invention is automatic seat belt and shoulder belt apparatus for helping to restrict movement of a user in an automobile, airplane, boat, or other vehicle, aircraft, or vessel. The apparatus includes track means preferably having an arcuate ceiling portion and a straight side portion, seat belt means having a first end slidably disposed in the track means, shoulder belt means having a first end slidably disposed in the track means, and movement means for automatically moving the belt means from an inoperative position in which the belt means do not interfere with movement of the user to an operative position in which the belt means restrict movement of the user and for moving the belt means from the operative position to the inoperative position, including means for causing the first ends of the seat belt means and of the shoulder belt means to move within the track means.

The apparatus preferably also comprises means for securing the ceiling portion of the track means to a ceiling of an automobile and means for securing the side portion of the track means in a substantially vertical position by securing the side portion to the door post of the automobile, and not to the door of the automobile.

The apparatus preferably includes means for automatically signalling the movement means to operate in response to a predetermined condition, such as, for example, the opening or closing of a door, the presence or absence of weight upon a seat, or the starting or stopping of the engine of an automobile.

The second end of the seat belt means is preferably attached to a belt retractor means and the second end of the shoulder belt means is preferably attached to a belt retractor means so that the apparatus is totally automatic and the user of the apparatus need not even tighten the belts once they are moved to the operative position.

Preferably, the belt means each comprise a belt and pulley attached to a first end of the belt, the pulley being disposed in the track means.

It is preferable that the track means and the belt means be mechanically independent of any door in the vehicle, aircraft, or watercraft.

BRIEF DESCRIPTION OF THE DRAWINGS

For a further understanding of the nature, objects, and advantages of the present invention, reference should be had to the following detailed description, read in conjunction with the following drawings, wherein like reference numerals denote like elements and wherein.

DETAILED DESCRIPTION OF THE PREFERRED EMBODIMENT

Figure 1:
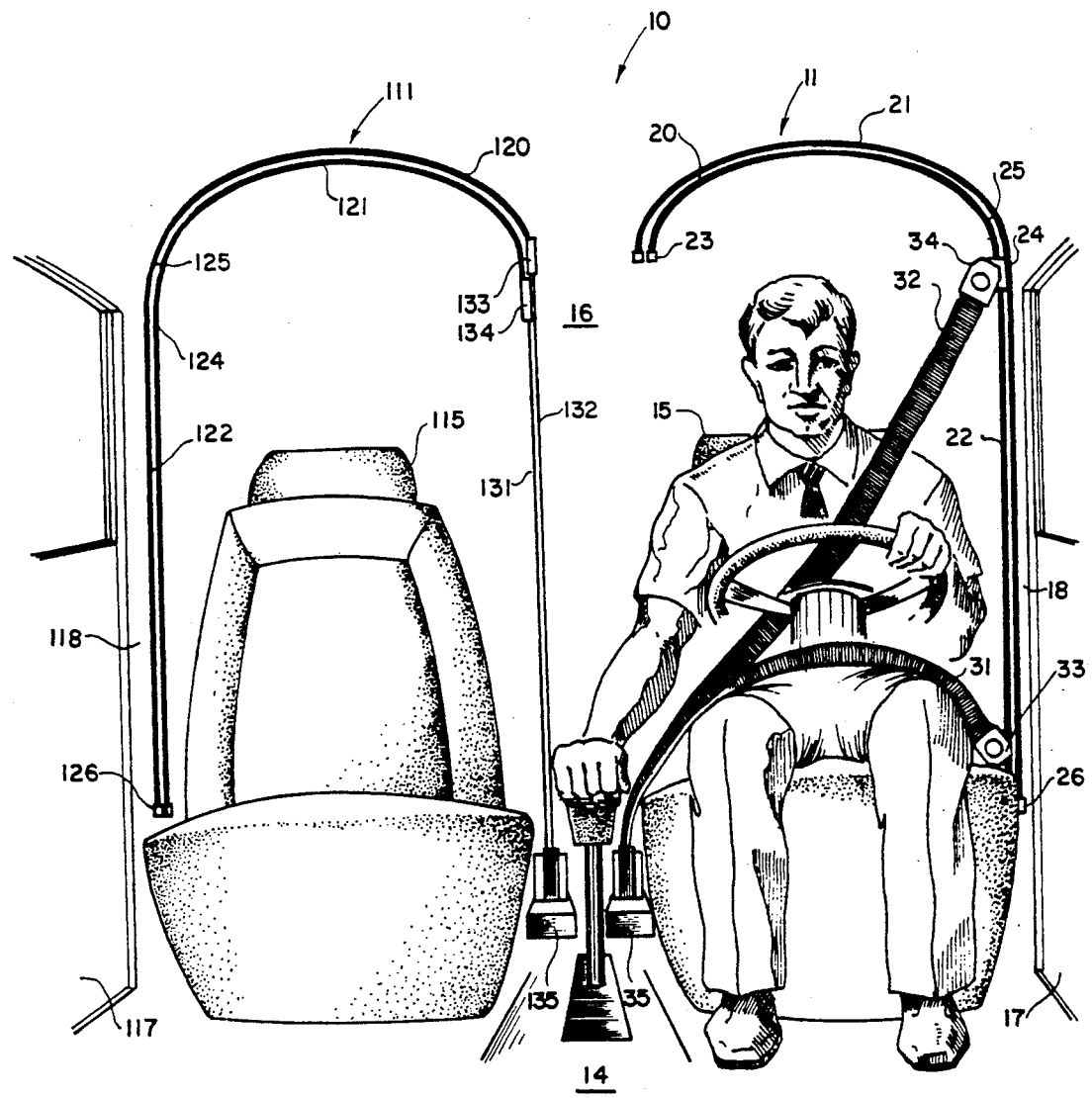
FIG. 1 is a perspective, front view of the interior of an automobile containing the preferred embodiment of present invention, showing the driver's belt system in operation and the passenger's belt system in the inoperative position.
Figure 2:
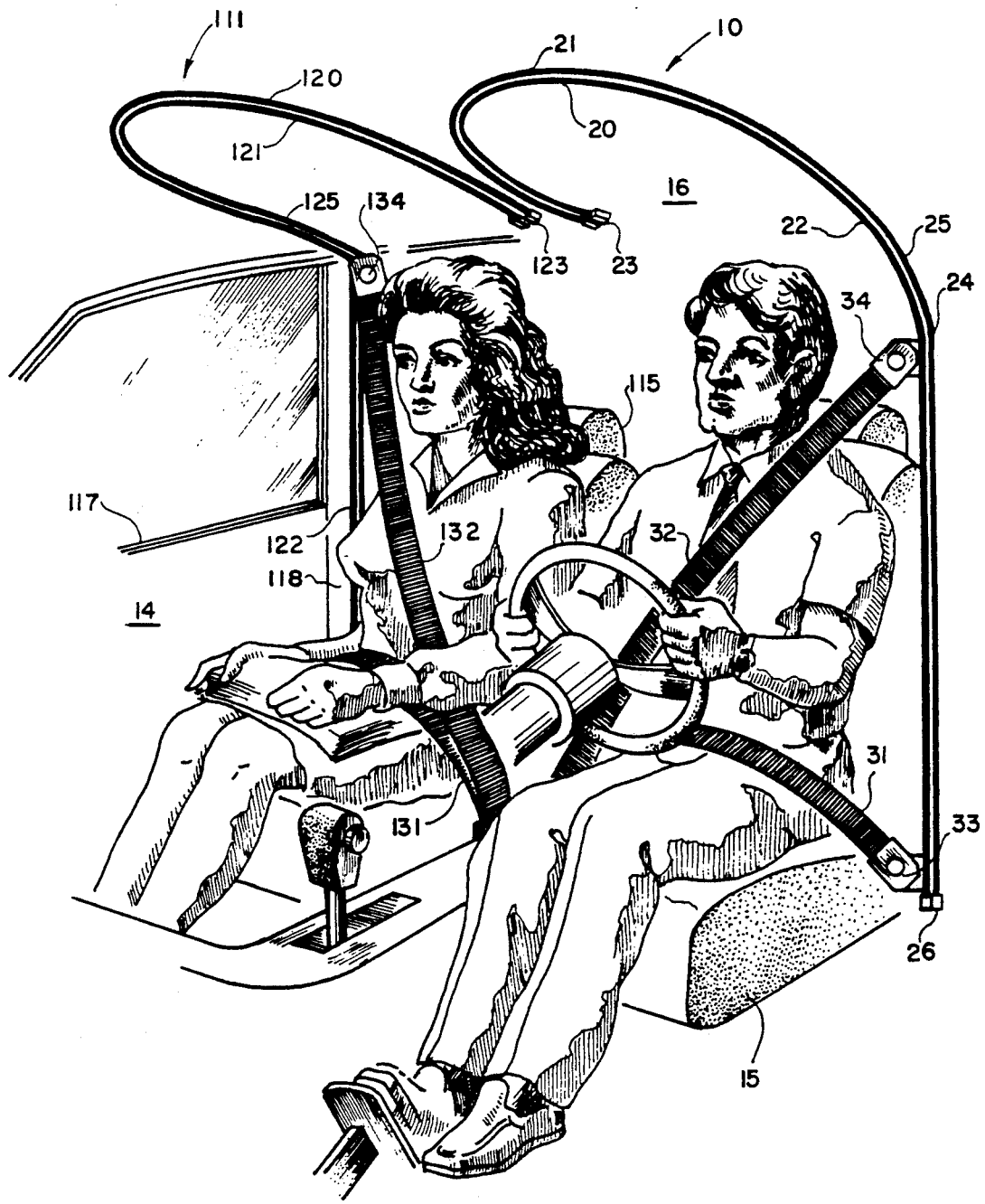
FIG. 2 is a perspective view of the embodiment of the invention shown in FIG. 1 with the belt systems of the passenger and driver in use.
Figure 3:
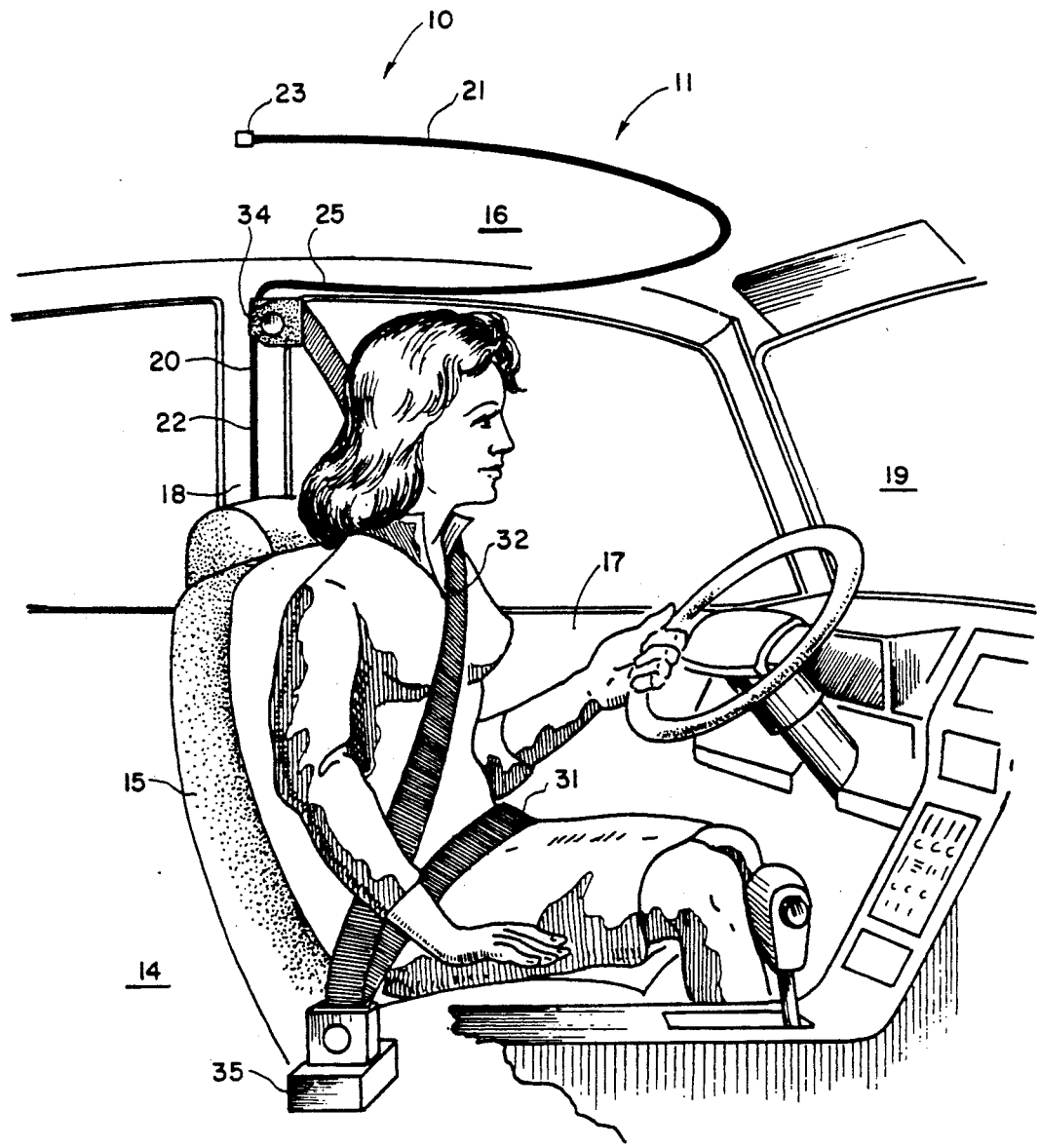
FIG. 3 is a side view of the embodiment of the invention shown in FIG. 1 showing only the driver's belt system.

Referring now to FIGS. 1-3, automatically activated seat and shoulder belt apparatus 10 comprises automatically activated seat and shoulder belt systems 11 and 111 for the driver and passenger of a car, respectively. Since systems 11 and 111 are essentially identical (one being the mirror image of the other), only system 11 will be described in detail.

Automatically activated seat and shoulder belt system 11 comprises a steel track or tracks 20 for the driver's seat belt 31 and the driver's shoulder belt 32. Track 20 is continuous and unitary and comprises a substantially horizontal, arcuate, ceiling portion 21 secured to or recessed in ceiling 16 or car 14, above seat 15, and a substantially straight, substantially vertical side portion 22 which is secured to or recessed in door post 18. Track or tracks 20 extends along ceiling 16 of car 14, from a first end 23, adjacent the central longitudinal axis of automobile 14, of ceiling portion 21, above and over seat 15, to the second end 25 of ceiling portion 21, and thence along door post 18 of car 14 to the second end 26 of side portion 22.

A seat belt 31 for the driver (seated in seat 15) of car 14 is secured at its first end to a pulley 33. The second end of seat belt 31 is disposed in belt retractor housing 35, which includes two automatic belt retractors (not shown), and is connected to one of the belt retractors. A shoulder belt 32 for the driver of car 14 is secured at its first end to a pulley 34. The second end of shoulder belt 32 is disposed in belt retractor housing 35 and is connected to one of the belt retractors (not shown). The belt retractors in housing 35 may be chosen, for example, from those disclosed in the following U.S. Pat. Nos. : 4,056,242; 4,580,812; 4,655,312; 4,667,904; 4,669,680; 4,700,974; 4,726,537; 4,747,565; 4,787,569; 4,830,310; and 4,907,757.

Pulleys 33 and 34 are automatically moved along track or tracks 20 using any suitable means (not shown, although track or tracks 20 preferably comprises a groove in which pulleys 33 and 34 are disposed). Pulleys 33 and 34 move belts 31 and 32, respectively, from the inoperative position (see the position of belts 131 and 132 in FIG. 1) in which belts 31 and 32 do not interfere with movement of the user to the operative position (see the position of belts 31 and 32 in FIG. 1) in which belts 31 and 32 restrict movement of the user automatically when, for example, seat 15 is sat upon, or the ignition key of car 14 is turned, or door 17 of car 14 is closed.

When system 11 is moving from the inoperative to the operative positions, seat belt pulley 33 and shoulder belt pulley 34 move along track or tracks 20 from the first end 23 of ceiling portion 21, along ceiling portion 21 forward of the torso of the user so that seat belt 31 and shoulder belt 32 move in front of the torso of the user. Pulleys 33 and 34 then continue to travel in ceiling portion 21 back toward second end 25 of ceiling portion 21 of track or tracks 20, seat belt 31 and shoulder belt 32 having thus traveled around the user's torso. Seat belt 31 and shoulder belt 32 are somewhat loose at this point, having become fully extended when pulley 33 was at some point along ceiling portion 21. Seat belt 31 remains loose so that it can easily slide over the user's torso as pulley 33 moves past first end 24 of side portion 22 of track or tracks 20 to a point where the first end of seat belt 31 is adjacent second end 26 of side portion 22. Pulley 34 continues to move in track or tracks 20, into side portion 22, until the first end of shoulder belt 32 is adjacent the first end 24 of side portion 22 of track or tracks 20.

Once the first end of seat belt 31 is adjacent second end 26 of side portion 22 of track or tracks 20, and the first end of shoulder belt 32 is adjacent the first end 24 of side portion 22 of track or tracks 20, the automatic belt retractors (not shown) automatically pull in any slack in belts 31 and 32. Belts 31 and 32 are then in the operative position. The automatic belt retractors can be signalled, for example, by signalling means having sensors in track or tracks 20 adjacent first end 24 of side portion 22 and adjacent second end 26 of side portion 22.

Pulleys 33 and 34 automatically move belts 31 and 32, respectively, from the operative to the inoperative position when, for example, a button is pushed, car 14 is turned off, or door 17 of car 14 is opened. The automatic belt retractors (not shown) in housing 35 unwind a sufficient amount of belt 31 before pulley 33 begins moving so that belt 31 can easily move around the user's torso without getting stuck on the user's body.

Track or tracks 20 may comprise a single groove having two stops or two separate parallel grooves, with the groove in which pulley 34 is disposed terminating at the position of pulley 34 shown in FIG. 1 and the groove in which pulley 33 is disposed terminating at the position of pulley 33 shown in FIG. 1. If only one groove is used, the stops would be located where the grooves, if two were being used, would terminate.

Figure 5:
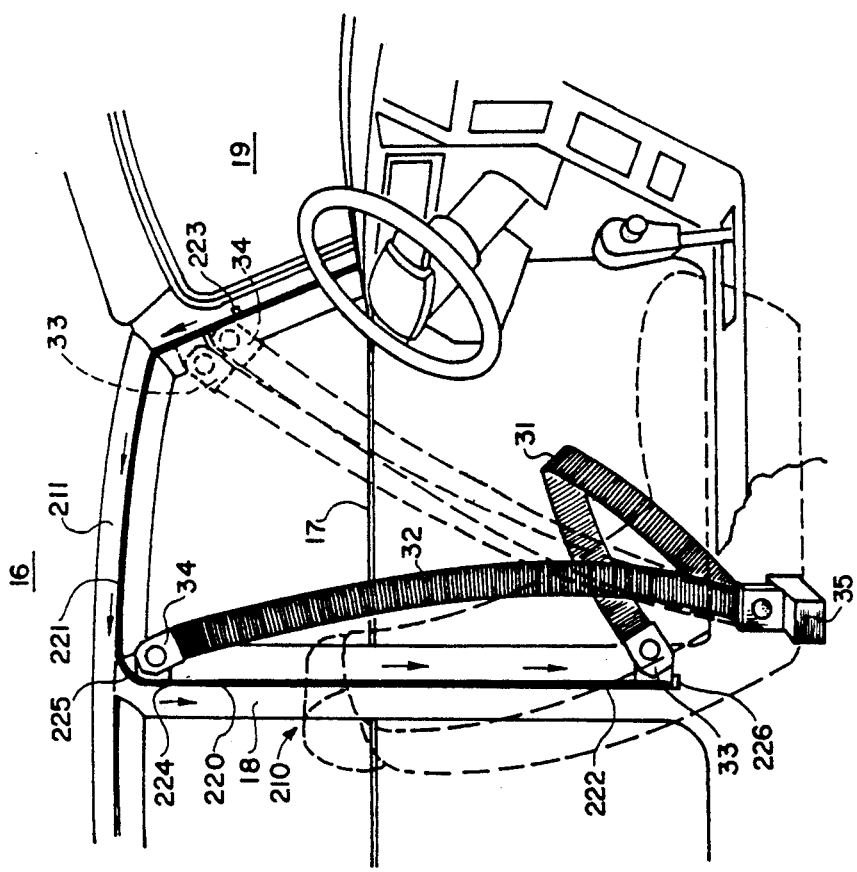
FIG. 5 is a side view, similar to FIG. 4, of the embodiment of the invention shown in FIG. 4, showing only the driver's belt system, omitting the driver and showing the seat in phantom for clarity of detail.
Figure 4:
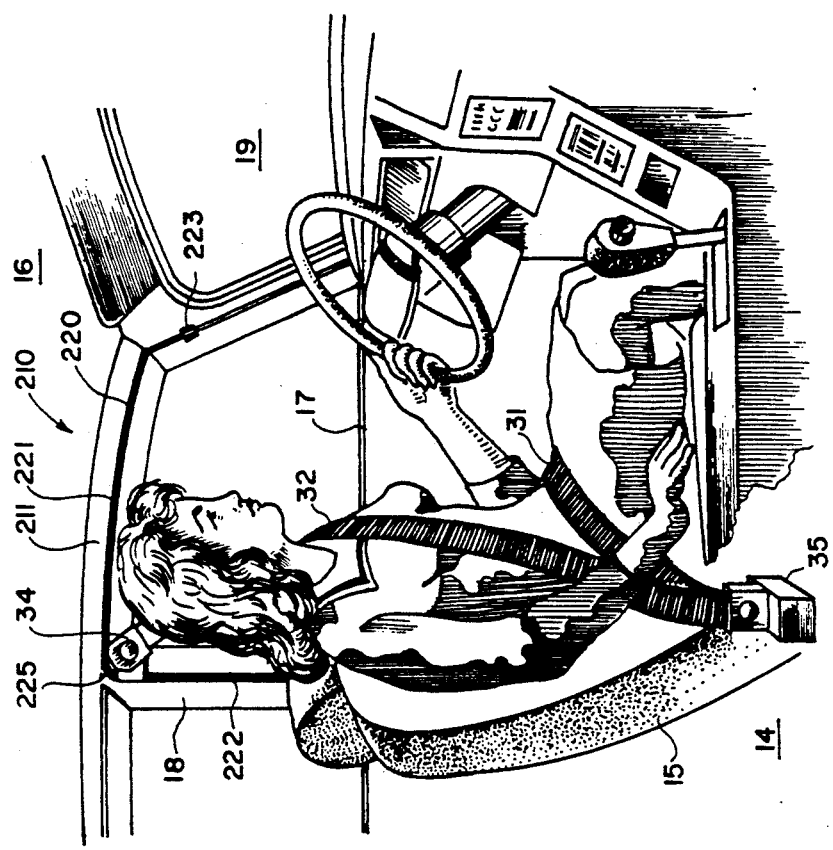
FIG. 4 is a side view of a second embodiment of the present invention, showing only the driver's belt system.

Referring now to FIGS. 4 and 5, automatically activated seat and shoulder belt apparatus 210 comprises automatically activated seat and shoulder belt system 211 for the driver of a car and a similar system (not shown) for the front-seat passenger of the car. Since the driver and passenger systems are essentially identical (one being the mirror image of the other), only system 211 will be described in detail.

Automatically activated seat and shoulder belt system 211 comprises a steel track or tracks 220 for the driver's seat belt 31 and the driver's shoulder belt 32. Track 220 is continuous and unitary and comprises a substantially horizontal ceiling portion 221 secured to or recessed in ceiling 16 of car 14 (or on or in the frame above door 17), above seat 15, and a substantially straight, substantially vertical side portion 222 which is secured to or recessed in door post 18. Track or tracks 220 extends along ceiling 16 of car 14, from a first end 223, adjacent the windshield 19 of automobile 14, of ceiling portion 221, above and along door 17, to the second end 225 of ceiling portion 221 adjacent door post 18, and thence along door post 18 of car 14 to the second end 226 of side portion 222.

Pulleys 33 and 34 are automatically moved along track or tracks 220 using any suitable means (not shown, although track or tracks 220 preferably comprises a groove in which pulleys 33 and 34 are disposed).

When system 211 is moving from the inoperative to the operative positions, seat belt pulley 33 and shoulder belt pulley 34 move along track or tracks 220 from the first end 223 of ceiling portion 221, along ceiling portion 221 adjacent the torso of the user toward second end 225 of ceiling portion 221 of track or tracks 220, seat belt 31 and shoulder belt 32 traveling rearwardly of the user's torso to a point where the first end of seat belt 31 is adjacent second end 226 of side portion 222. Pulley 34 continues to move in track or tracks 220, into side portion 222, until the first end of shoulder belt 32 is adjacent the first end 224 of side portion 222 of track or tracks 220.

Once the first end of seat belt 31 is adjacent second end 226 of side portion 222 of track or tracks 220, and the first end of shoulder belt 32 is adjacent the first end 224 of side portion 222 of track or tracks 220, the automatic belt retractors (not shown) automatically pull in any slack in belts 31 and 32. Belts 31 and 32 are then in the operative position. The automatic belt retractors can be signalled, for example, by signalling means having sensors in track or tracks 220 adjacent first end 224 of side portion 222 and adjacent second end 226 of side portion 222.

As with track or tracks 20, track or tracks 220 may comprise a single groove having two stops or two separate parallel grooves, with the groove in which pulley 34 is disposed terminating at the position of pulley 34 shown in FIG. 4 and the groove in which pulley 33 is disposed terminating at the lower position of pulley 33 shown in FIG. 5. If only one groove is used, the stops would be located where the grooves, if two were being used, would terminate.

Figure 7:
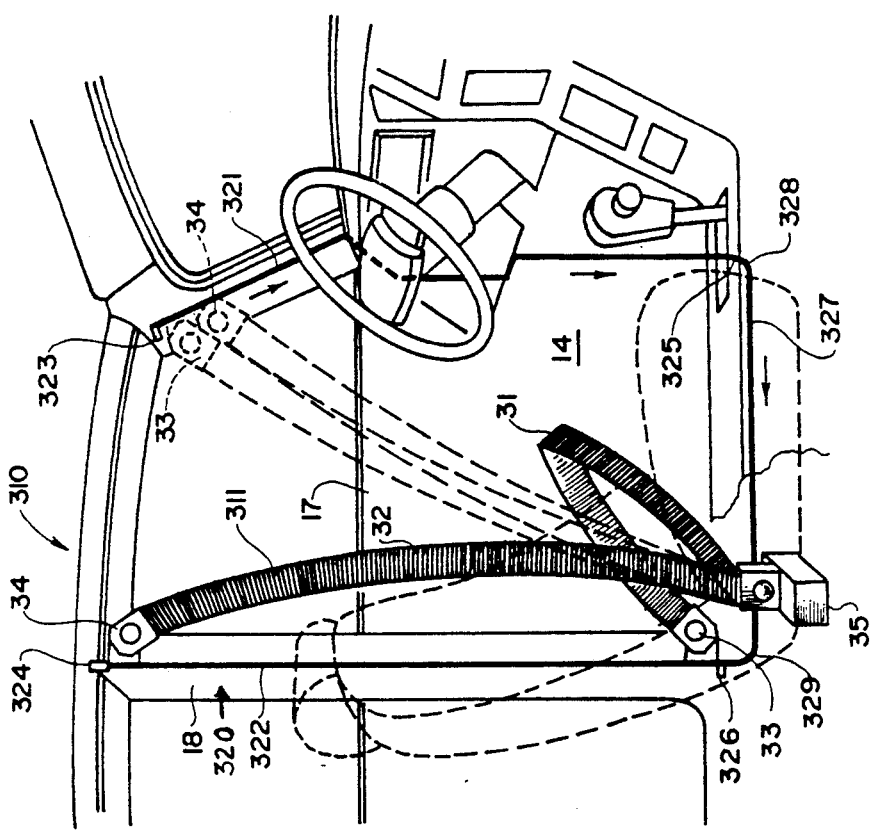
FIG. 7 is a side view, similar to FIG. 5, of the embodiment of the invention shown in FIG. 5, showing only the driver's belt system, omitting the driver and showing the seat in phantom for clarity of detail.
Figure 6:
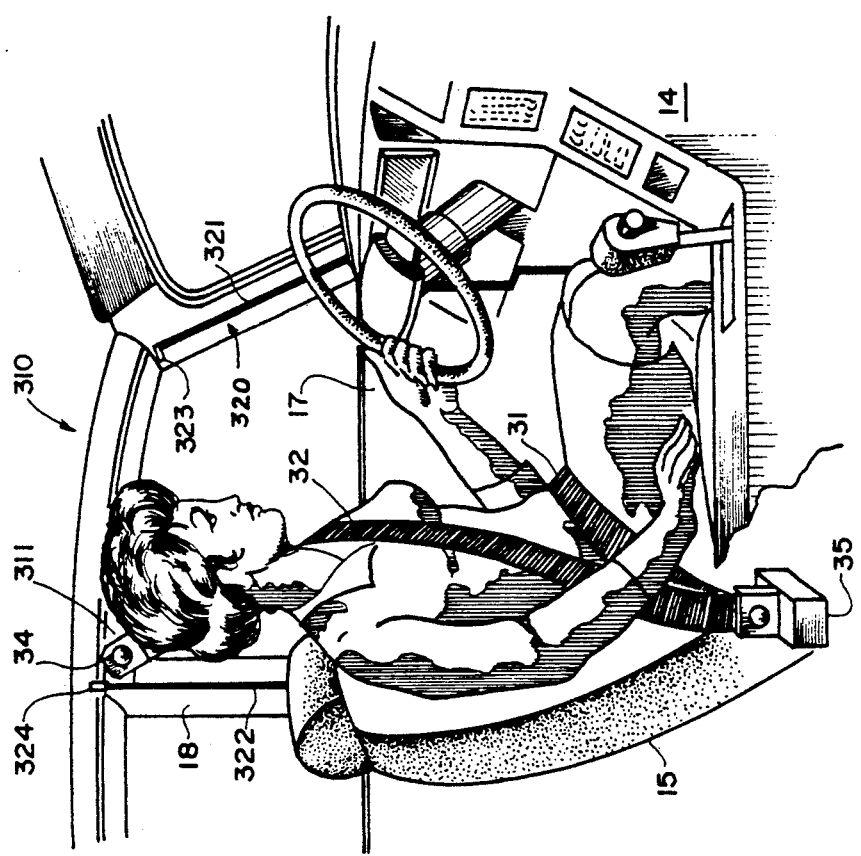
FIG. 6 is a side view of a third embodiment of the present invention, showing only the driver's belt system.

Referring now to FIGS. 6 and 7, automatically activated seat and shoulder belt apparatus 310 comprises automatically activated seat and shoulder belt system 311 for the driver of a car and a similar system (not shown) for the front-seat passenger of the car. Since the driver and passenger systems are essentially identical (one being the mirror image of the other), only system 311 will be described in detail.

Automatically activated seat and shoulder belt system 311 comprises a steel track or tracks 320 for the driver's seat belt 31 and the driver's shoulder belt 32. Track 320 is continuous and unitary and comprises a substantially vertical forward portion 321 secured to the front interior of car 14, on or in the frame adjacent door 17, forwardly of seat 15, a substantially straight, substantially vertical rearward portion 322 which is secured to or recessed in door post 18, and a substantially horizontal floor portion 327 which is disposed below door 17. Track or tracks 320 extends along the interior of car 14, from a first end 323, adjacent the windshield 19 of automobile 14, of forward portion 321, along door 17 (and over the dashboard of car 16), to the second end 325 of forward portion 321, to the first end 328 of floor portion 327, below and along door 17 to the second end 329 of floor portion 327, to the second end 326 of rearward portion 322, and thence along door post 18 of car 14 to the first end 324 of rearward portion 322.

Pulleys 33 and 34 are automatically moved along track or tracks 320 using any suitable means (not shown, although track or tracks 320 preferably comprises a groove in which pulleys 33 and 34 are disposed).

When system 311 is moving from the inoperative to the operative positions, seat belt pulley 33 and shoulder belt pulley 34 move along track or tracks 320 from the first end 323 of forward portion 321, along forward portion 321 adjacent the front of the car past second end 325 of forward portion 321 of track or tracks 320 and first end 328 of floor portion 327, along floor portion 327 to second end 329 of floor portion 327, seat belt 31 and shoulder belt 32 traveling rearwardly of the user's torso to a point where the first end of seat belt 31 is adjacent second end 326 of rearward portion 322. Pulley 34 continues to move in track or tracks 320, into rearward portion 322, until the first end of shoulder belt 32 is adjacent the first end 324 of rearward portion 322 of track or tracks 320.

Once the first end of seat belt 31 is adjacent second end 326 of rearward portion 322 of track or tracks 320, and the first end of shoulder belt 32 is adjacent the first end 324 of rearward portion 322 of track or tracks 320, the automatic belt retractors (not shown) automatically pull in any slack in belts 31 and 32. Belts 31 and 32 are then in the operative position. The automatic belt retractors can be signalled, for example, by signalling means having sensors in track or tracks 320 adjacent first end 324 of rearward portion 322 and adjacent second end 326 of rearward portion 322.

As with tracks 20 and 220, track or tracks 320 may comprise a single groove having two stops or two separate parallel grooves, with the groove in which pulley 33 is disposed terminating at the lower position of pulley 33 shown in FIG. 7 and the groove in which pulley 34 is disposed terminating at the position of pulley 34 shown in FIG. 6. If only one groove is used, the stops would be located where the grooves, if two were being used, would terminate. Although the apparatus of the present invention has been shown and described in conjunction with an automobile, it can also advantageously be used in airplanes and buses, for example, in which cases the ceiling portion 21, 221 of track or tracks 20, 220 would still be secured to the ceiling, but the side portion 22, 222, and rearward portion 322 could be secured to one side of the seat, and forward portion 321 could be secured to the seat in front of the passenger.

The foregoing embodiments are presented by way of example only; the scope of the present invention is to be limited only by the following claims.

I claim:

1. Automatic seat belt and shoulder belt apparatus for helping to restrict movement of a user in a vehicle having a door, comprising:
   (a) track means;
   (b) seat belt means having a first end slidably disposed in the track means and a second end attached to a belt retractor means;
   (c) shoulder belt means having a first end slidably disposed in the track means and a second end attached to a belt retractor means; and
   (d) movement means for automatically moving the seat belt means and shoulder belt means from an inoperative position in which the seat belt means and shoulder belt means do not interfere with movement of the user to an operative position in which the seat belt means and shoulder belt means restrict movement of the user and for moving the seat belt means and shoulder belt means from the operative position to the inoperative position, including means for causing the first ends of the seat belt means and of the shoulder belt means to move within the track means, wherein
   the track means comprises a substantially vertical side portion and a substantially horizontal floor portion adjacent the door of the vehicle.

2. The apparatus of claim 1, further comprising:
means for automatically signalling the movement means to operate in response to a predetermined condition.

3. The apparatus of claim 1, wherein:
the seat belt means and shoulder belt means each comprise a belt and pulley attached to the first end of the belt, the pulley being disposed in the track means.

4. The apparatus of claim 1, wherein:
the track means and the seat belt means and shoulder belt means are mechanically independent of any door in the vehicle.

5. The apparatus of claim 1, wherein:
the substantially horizontal floor portion connects the substantially vertical side portion to an additional substantially vertical side portion.

6. The apparatus of claim 5, wherein the apparatus is for use in a motor vehicle, and further comprising:
   (e) means for securing the floor portion adjacent a floor of the motor vehicle; and
   (f) means for securing the side portions in substantially vertical positions.

7. The apparatus of claim 6, wherein:
the motor vehicle further includes a door post; and
the floor portion is secured along and below the door of the motor vehicle and one of the substantially straight side portions is secured along the door post of the motor vehicle.

8. Automatic seat belt and shoulder belt apparatus for helping to restrict movement of a user in motor vehicles, watercraft, and aircraft, comprising:
   (a) track means;
   (b) seat belt means having a first end slidably disposed in the track means and a second end attached to a belt retractor means;

(c) shoulder belt means having a first end slidably disposed in the track means and a second end attached to a belt retractor means; and
(d) movement means for automatically moving the seat belt means and shoulder belt means from an inoperative position in which the seat belt means and shoulder belt means do not interfere with movement of the user to an operative position in which the seat belt means and shoulder belt means restrict movement of the user and for moving the belt means from the operative position to the inoperative position, including means for causing the first ends of the seat belt means and of the shoulder belt means to move within the track means, wherein the track means comprises a substantially horizontal floor position connected to a substantially vertical side portion.

9. The apparatus of claim 8, wherein the apparatus is for use in a motor vehicle, and further comprising:
(e) means for securing the floor portion adjacent a floor of the motor vehicle; and
(f) means for securing the side portion in a substantially vertical position.

10. The apparatus of claim 9, wherein:
the motor vehicle includes a door and a door post; and
the floor portion is secured along and below the door of a motor vehicle and the substantially straight side portion is secured along the door post of the motor vehicle.

11. Automatic seat belt and shoulder belt apparatus for helping to restrict movement of a user in a seat in motor vehicles, watercraft, and aircraft, comprising:
(a) track means;
(b) seat belt means having a first end slidably disposed in the track means and a second end attached to a belt retractor means;
(c) shoulder belt means having a first end slidably disposed in the track means and a second end attached to a belt retractor means; and
(d) movement means for automatically moving the seat belt means and shoulder belt means from an inoperative position in which the seat belt means and shoulder belt means do not interfere with movement of the user to an operative position in which the seat belt means and shoulder belt means restrict movement of the user and for moving the seat belt means and shoulder belt means from the operative position to the inoperative position, including means for causing the first ends of the seat belt means and of the shoulder belt means to move within the track means, wherein the track means comprises a substantially horizontal floor portion and a substantially vertical side portion positioned forwardly of the seat.

12. The apparatus of claim 11, wherein the apparatus is for use in a motor vehicle, and further comprising:
(e) means for securing the floor portion adjacent a floor of the motor vehicle; and
(f) means for securing the side portion in a substantially vertical position.

13. The apparatus of claim 12, wherein:
the motor vehicle includes a door and a door post; and
the floor portion is secured along and below the door of a motor vehicle and there is an additional substantially straight side portion secured along the door post of the motor vehicle.

14. The apparatus of claim 11, wherein:
the substantially horizontal floor portion is connected to the substantially vertical side portion.

15. The apparatus of claim 11, wherein:
the substantially horizontal floor position connects the substantially vertical side portion to another substantially vertical side portion positioned adjacent the seat.

16. The apparatus of claim 15, wherein:
the substantially vertical side portion positioned forwardly of the seat has an upper end and a lower end, and the substantially vertical side portion positioned adjacent the seat has an upper end and a lower end, and the first end of the seat belt means travels from upper end of the substantially vertical side portion positioned forwardly of the seat to the lower end of the substantially vertical side portion positioned adjacent the seat, and the first end of the shoulder belt means travels from upper end of the substantially vertical side portion positioned forwardly of the seat to the upper end of the substantially vertical side portion positioned adjacent the seat.

* * * * *